United States Patent [19]

Ogiwara

[11] 4,238,455
[45] Dec. 9, 1980

[54] DENITRIFICATION REACTOR

[75] Inventor: Toshiaki Ogiwara, Funabashi, Japan

[73] Assignee: Ishikawajima-Harima Jukogyo Kabushiki Kaisha, Tokyo, Japan

[21] Appl. No.: 38,261

[22] Filed: May 11, 1979

[30] Foreign Application Priority Data

Jun. 27, 1978 [JP] Japan .............................. 53-88306[U]

[51] Int. Cl.³ .......................... B01J 35/04; F01N 3/10
[52] U.S. Cl. ................................ 422/171; 422/177; 422/191; 422/232; 104/88
[58] Field of Search .............. 422/171, 173, 183, 177, 422/178, 180, 191–193, 232; 423/239; 210/150; 414/137, 138; 104/88

[56] References Cited

U.S. PATENT DOCUMENTS

| | | | |
|---|---|---|---|
| 2,718,460 | 9/1955 | Bowen | 422/171 |
| 3,168,955 | 2/1965 | Black | 414/138 |
| 3,819,334 | 6/1974 | Yoshida et al. | 422/173 |
| 3,828,680 | 8/1974 | Farren | 104/88 |
| 4,125,380 | 11/1978 | Negola | 422/171 |

*Primary Examiner*—Benoit Castel
*Attorney, Agent, or Firm*—Scrivener, Parker, Scrivener and Clarke

[57] ABSTRACT

Disclosed is a denitrification reactor wherein each of catalyst cells is provided by packing a plurality of honeycomb catalyst blocks into a box-shaped frame with four corner posts; a plurality of vertical guide posts are erected in such a spaced apart relationship that four adjacent vertical guide posts may vertically guide the corner posts of each catalyst cell; and the catalyst cells with honeycomb catalyst blocks are charged along said vertical guide posts and are pressed thereagainst.

5 Claims, 13 Drawing Figures

DENITRIFICATION REACTOR

FIELD OF THE INVENTION

The present invention relates to generally a reactor for a fixed-bed system wherein a process fluid is made into contact with catalyst and, more particularly, to a fixed-bed type denitrification reactor.

BACKGROUND OF THE INVENTION

Strict anti-pollution codes have been enforced in order to suppress the emission of various pollutants into the atmosphere. In order to suppress the emission of nitrogen oxides ($NO_x$), there has been devised and successfully demonstrated a denitrification system wherein the effluent is brought into contact with catalyst in the presence of $NH_3$. Such denitrification systems must be increased in capacity proportionally to the increase in capacity of a pollution source such as a boiler furnace. As a result, a large amount of catalyst is required. For instance, in order to denitrate the effluent at a rate of 1,000,000 $Nm^3/h$, the catalyst amounting to about 200 $m^3$ is required.

The effective lifetime of catalyst is in general from one to four years and the replacement of catalyst is permitted only during the short periodic inspections of for instance a steam boiler. Furthermore, the catalyst blocks or the like, which are easily susceptible to cracking, must be handled with special care.

In order to facilitate the handling of catalyst, there has been devised and demonstrated a method wherein a plurality of catalyst blocks or the like are packed within a case with a suitable strength. The case has two opposed open ends, through which the catalyst blocks or the like are merely inserted into the case. Furthermore such cases packed with catalyst blocks or the like are merely stacked or piled up in a denitrification reactor so that spaces are left between the adjacent cases and the effluence flows through these spaces without passing through the catalyst blocks or the like, thereby resulting in the decrease in denitrification efficiency. Moreover, the catalyst blocks or the like packed in the cases are frequently susceptible to cracking and fracture because of the vibration or impact during the handling.

The catalyst blocks or the like must be packed into a case in such a way that the gas-tightness may be ensured between the adjacent catalyst blocks or the like and between the catalyst blocks or the like and the case.

However it is extremely difficult to fabricate the catalyst blocks or the like into such a shape that the gas-tightness may be ensured between the stacked or piled up catalyst blocks. If this were possible, it would be more difficult to insert or pack the catalyst blocks into a case in such a gas-tight manner as described above. Furthermore, as described above, the catalyst blocks or the like are very fragile so that it will take an inhibitively long time to pack them into a case. Sealing the spaces left between the stacked or piled up catalyst blocks or the like would be also an inhibitively time- and labor-consuming operation.

A further problem of the cases packed with the catalyst blocks or the like is that because of the limited strength of the cases, there is a limit to the number of cases stacked in the reactor. As a result, the prior art catalyst case system is not adapted for use in a denitrification reactor with a large capacity.

Accordingly, one of the objects of the present invention is to provide a denitrification reactor wherein catalyst cells may be loaded or off-loaded within a short time and wherein the catalyst cells are packed with the catalyst blocks and are stacked in the reactor vessel in such a gas-tight manner that the effluent may be completely prevented from bypassing the catalyst blocks.

The present invention will become apparent from the following description of one preferred embodiment thereof taken in conjunction with the accompanying drawings.

DESCRIPTION OF THE PREFERRED EMBODIMENT

Referring to FIGS. 1-7, the embodiment of a denitrification reactor in accordance with the present invention, comprises in general a main body 13 of the reactor, a looped guide rail 18 mounted on the top of the main body 13 and vertically spaced apart therefrom by a suitable distance, a hoist 17 which moves along the guide rail 18 for charging a catalyst cell 1 into the main body 13, and two catalyst cell stacking racks each consisting of vertical guide frames 14 and horizontal guides 15 so as to hold the catalyst cells 1 stacked in the main body 13 in a manner to be described in detail below.

Figure 4:
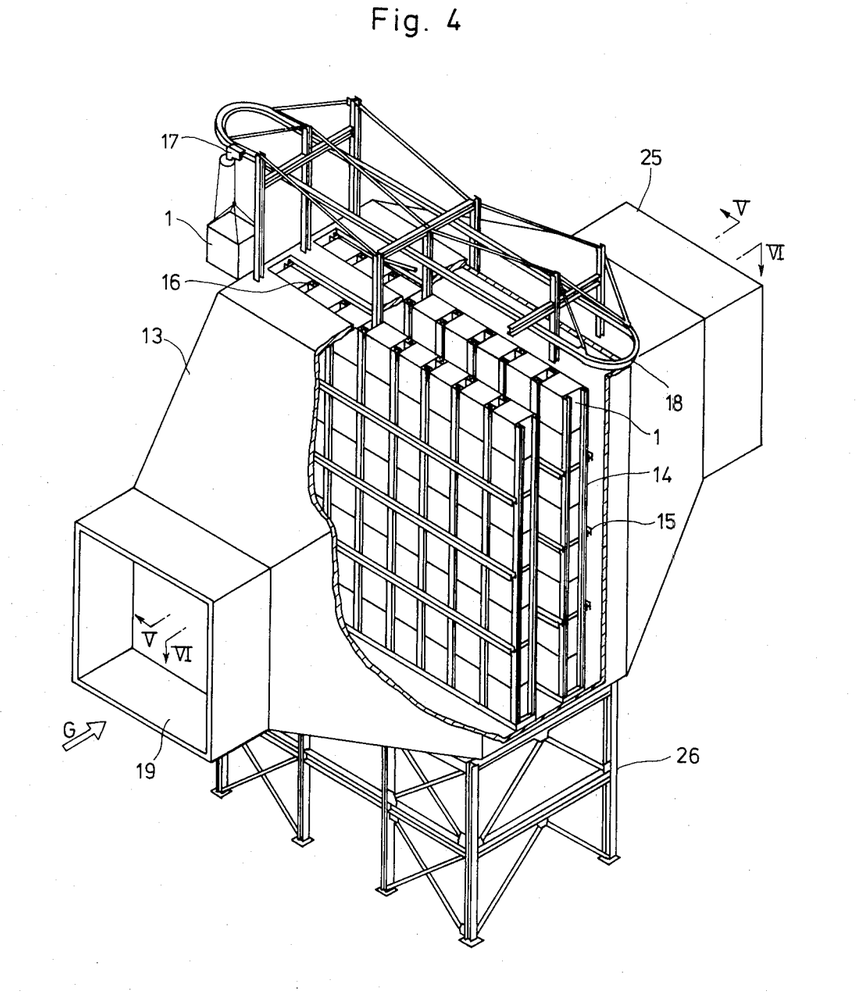
FIG. 4 is a perspective view of a denitrification reactor in accordance with the present invention with shells being partly removed so as to show the catalyst cells stacked in it.
Figure 5:
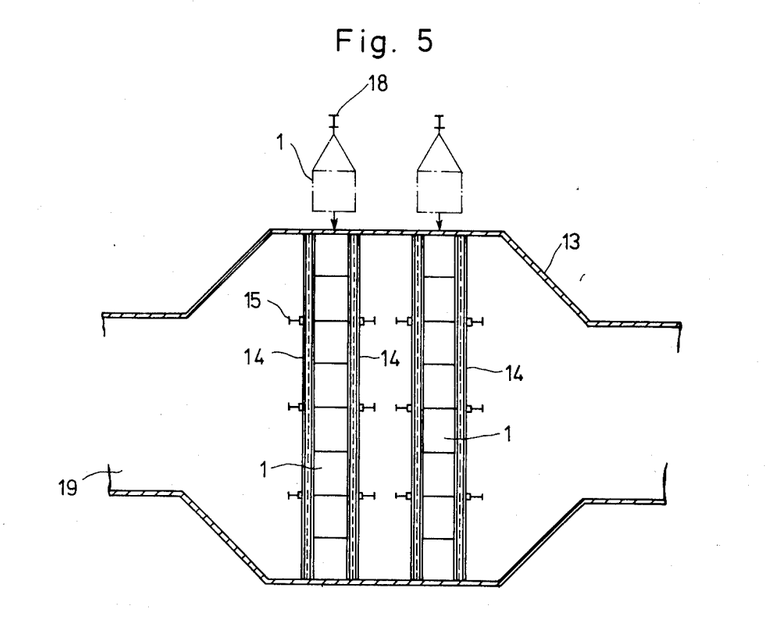
FIG. 5 is a sectional view taken along the line V—V of FIG. 4.
Figure 6:
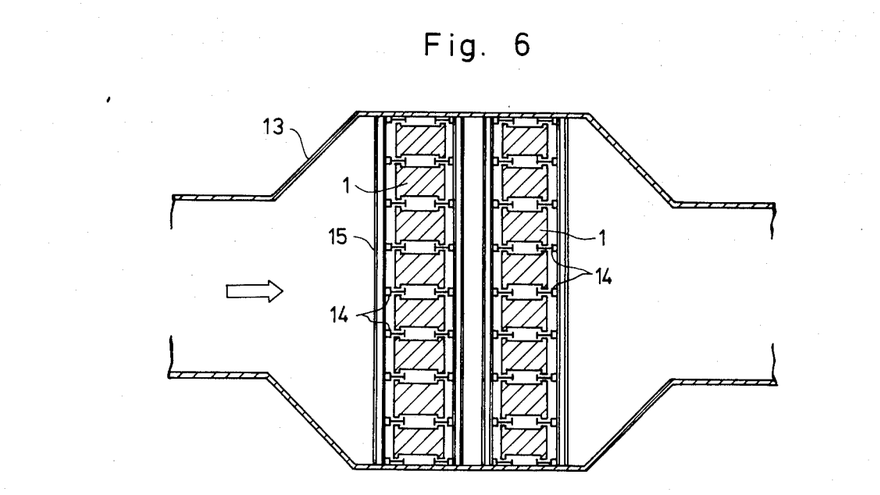
FIG. 6 is a sectional view taken along the line VI—VI of FIG. 4.

The main body or reactor vessel 13, which is mounted on a stand 26, has a gas or effluent inlet 19, an outlet 25 and catalyst cell charging and discharging openings 16 formed through the top.

Figure 1:
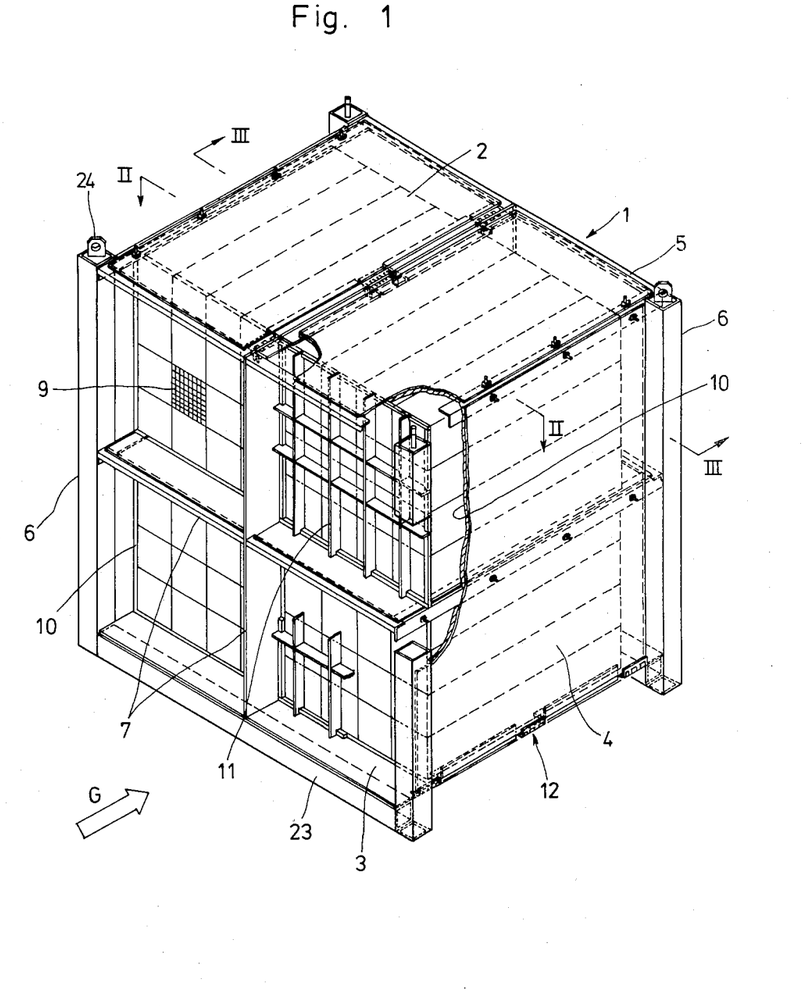
FIG. 1 is a perspective view of a catalyst cell in accordance with the present invention.
Figure 2:
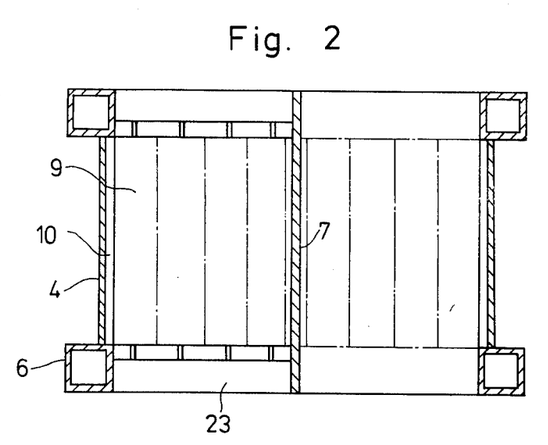
FIG. 2 is a sectional view taken along the line II—II of FIG. 1.
Figure 3:
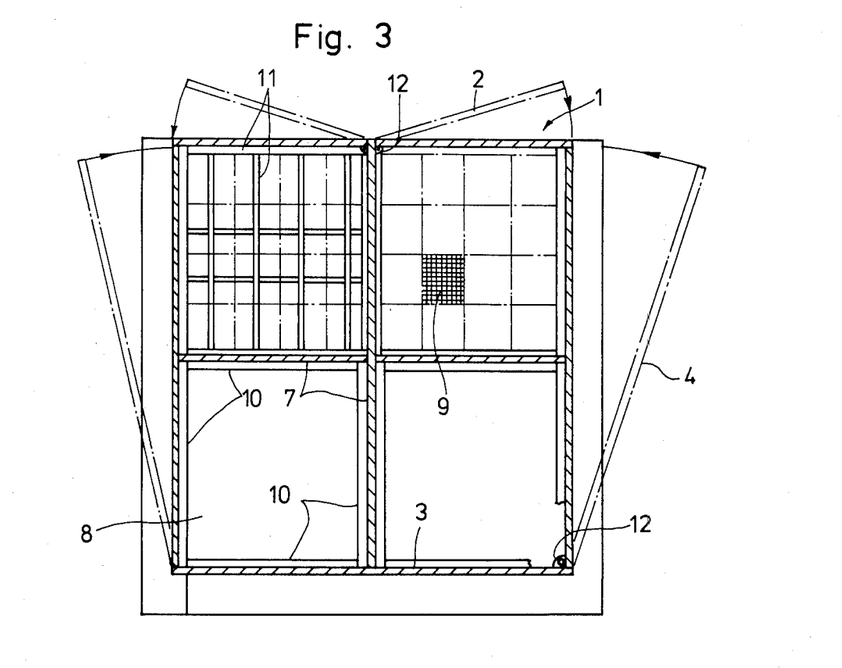
FIG. 3 is a sectional view taken along the line III—III of FIG. 1.

As best shown in FIGS. 1-3, each of the catalyst cells 1 contains a plurality of "honeycomb" catalyst blocks 9 which are defined in this specification as "a block of catalyst in the form of a square pillar with a plurality of longitudinally extended through holes each having a circular or polygonal cross section". The catalyst cell 1 comprises in general bottom blocks 23, four corner posts 6 each with a hoisting eye 24 at its upper end, a box-shaped frame 5 consisting of two top plates 2 each having its inner lengthwise side swingably attached with a hinge 12 to a lengthwise brace or header (See FIG. 3), a bottom wall 3 and, two lengthwise side walls 4 each having its lower side swingably attached with a hinge 12 to the bottom plate 3 (See also FIG. 3), vertical and horizontal partition walls 7 which divide the catalyst cell 1 into four catalyst block receiving stowing chambers 8 and grating-like stoppers or retainers 11 each of which is fitted into the opening of the chamber 8 so as to securely retain the catalyst blocks stacked in it.

According to the present invention, in order to ensure the complete or gas-tight contact between the adjacent catalyst blocks 9 charged into the chamber 8 so as to completely eliminate the clearance between them, packing sheets 10 made of ceramic fiber are interposed between the catalyst blocks 9 on the one hand and the top walls 2, the bottom wall 3, the side walls 4 and the vertical and horizontal partition walls 7 on the other hand.

As best shown in FIG. 4, the catalyst cells 1 are charged through the charging opening 16 into the main body or reactor vessel 13 and piled up in the rack (14, 15) in such a way that the axes of the catalyst cells 1 are in parallel with the axis of the main body or reactor vessel 13.

Figure 7:
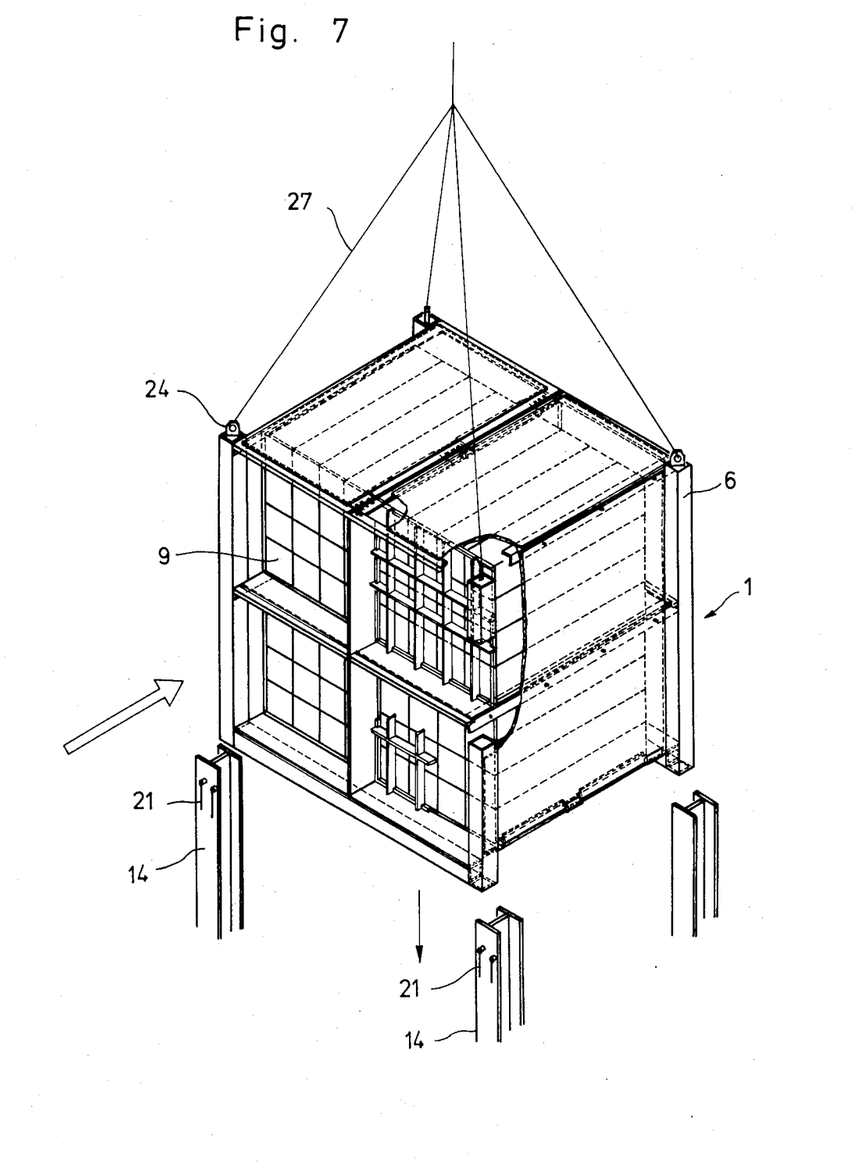
FIG. 7 is a view used for the explanation of the step for stacking the catalyst cell in a catalyst cell stowing rack installed within the reactor vessel.

As best shown in FIGS. 4–7, the two racks (14, 15) are spaced apart from each other by a suitable distance in the axial direction and located immediately below the charging openings 16. The vertical guide frames 14, which are of the H-shape (See FIG. 7), are spaced axially and transversely from each other by such distances that the corner posts 6 of the catalyst cell 1 may be snugly fitted into the channels of the vertical guide frames 14. That is, as best shown in FIG. 7, the catalyst cell 1 is lifted with the wires 27 by the hoist 17 to a height above the top of the main body or reactor vessel 13. Then the hoist 17 moves along the guide rails 18 so as to bring the suspended catalyst cell 1 to a position above a predetermined stacking position in each rack (14, 15). Thereafter the catalyst cell 1 is lowered gradually in such a way that the corner posts 6 of the cell 1 may be fitted into the channels of the vertical guide frames 14.

Figure 8:
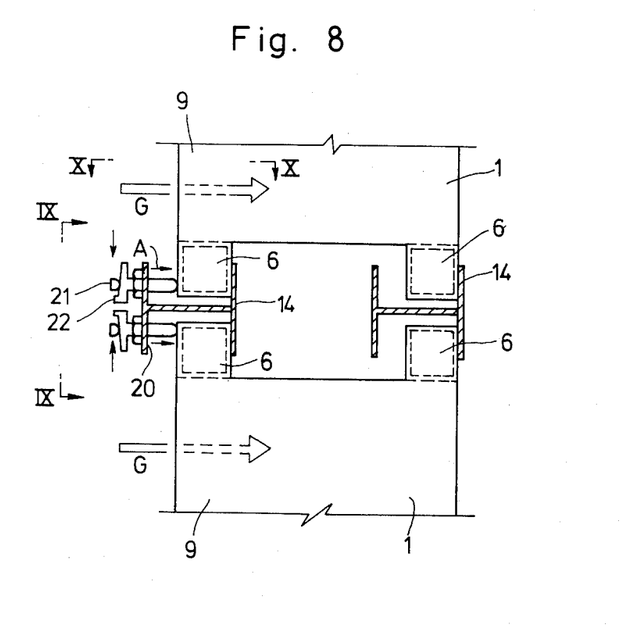
FIG. 8 shows a clamping means in accordance with the present invention for gas-tightly pressing the corner post of the catalyst cell against the flange of a vertical guide post.
Figure 9:
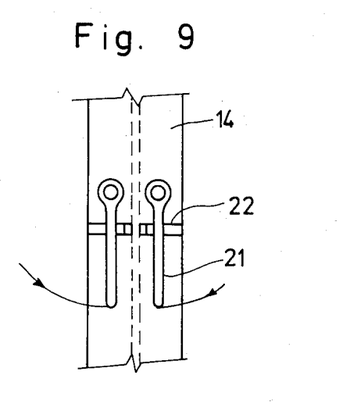
FIG. 9 is a view looking in the direction indicated by the arrow IX of FIG. 8.
Figure 10:
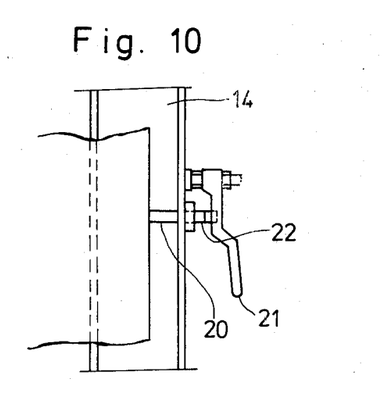
FIG. 10 is a view looking in the direction indicated by the arrow X of FIG. 8.

As shown in FIGS. 8, 9 and 10, according to the present invention, means for tightly pressing the corner posts 6 of the catalyst cell 1 against the flanges of the vertical guide frames 14 is provided. This means, which is referred to as "clamping means" in this specification, comprises a clamping pin 20 which is slidably extended through the flange of the vertical guide frame 14 and is formed integral with a tapered head 22, and a clamping handle 21 swingably pivoted to the flange of the vertical guide frame 14 for engagement with the tapered head 22. The tapered head 22, which is nearly in the form of a wedge, is extended horizontally in such a way that the edge of the inclined surface thereof may be directed outwardly transversely. Therefore when an operator turns the handle 21 downwards as indicated by the arrow in FIG. 9 so as to engage it with the inclined surface of the wedge-like head 22 and further turns the handle 21 toward its downwardly directed position shown in FIG. 9, the clamping pin 20 is forced against the corner post 6 of the catalyst cell 1 as indicated by the arrow A in FIG. 8 and consequently the corner post 6 may be forcibly pressed against the flanges of the vertical guide frames 14 (See FIG. 8).

Next the step for stowing the catalyst blocks 9 into the stowing chambers 8 of the catalyst cell 1 and the step for stowing the catalyst cells 1 in the racks (14, 15) in the main body or reactor vessel 13 will be described in detail. The catalyst blocks 9 are stowed in the catalyst cells in the factory. First, as indicated by the two-dot chain lines in FIG. 3, the top and side panels 2 and 4 are opened, and the packing sheets 10 are placed over the bottom wall 3 and the vertical and horizontal partition walls 7. A predetermined number of catalyst blocks 9 are stowed very compactly in each of the stowing chambers 8. Thereafter the packing sheets 10 are placed over the top and lengthwise side of each of the piles of catalyst blocks 9 in the chambers 8, and the top and side walls 2 and 4 are closed so that the packing sheets 10 are compressed. As a result, the adjacent blocks 9 are gas-tightly pressed against each other while the outer catalyst blocks 9 of each pile are also gas-tightly pressed through the packing sheets 10 against the top walls 2, the lengthwise side walls 4, the bottom 3 and the vertical and horizontal partition walls 7, so that not only the gas-tight stowing of the catalyst blocks 9 may be ensured but also the damages to the catalyst blocks may be eliminated during the handling and transferring of the catalyst cells 1. Thereafter the catalyst block stoppers or retainers 11 are securely fitted into the open ends of the stowing chambers 8, whereby the gas-tightness as well as the damage-free handling of the cell 1 may be further ensured.

In order to charge the catalyst cells 1 into the main body or reactor vessel 13, the hoist 17 lifts the catalyst cell 1 to a height above the top of the main body or reactor vessel 13 (See FIG. 4) and then moves along the guide rail 18 to a position immediately above a predetermined piling position. Next the hoist 17 gradually lowers the catalyst cell 1 through the charging opening 16 in such a way that the corner posts 6 of the cell 1 may be fitted into the channels of the vertical guide frames 14 (See FIG. 7). Thereafter the catalyst cell 1 is lowered along the vertical guide frames 14 to a predetermined position. When the catalyst cell 1 is placed in position, the operator turns the handle 21 (See FIGS. 8, 9 and 10) so as to force the clamping pin 20 against the corner post 6 of the cell 1, thereby moving the catalyst cell 1 in the direction indicated by the arrow G in FIG. 8 (that is, the direction of the gas flow) so as to cause the corner posts 6 of the cell 1 to be gas-tightly pressed against the flanges of the vertical guide frames 14. Thus the catalyst cell 1 may be securely held in position in the catalyst cell rack (14, 15). In like manner, the catalyst cells 1 may be sequentially stowed in stacks in the racks (14, 15). Because of this stowing arrangement, the gas-tightness between the corner posts 6 of the catalyst cells 1 and the flanges of the vertical guide frames 14 may be ensured so that the effluent may pass only through the circular or polygonal through holes or passages of the catalyst blocks 9.

It is to be understood that the present invention is not limited to the embodiment described above and that various modifications may be effected without departing from the true spirit of the present invention. For instance, instead of the hoist 17, any suitable hoisting machines may be used. Instead of the clamping device (20, 21 and 22), any suitable clamping means such as bolts may be employed. The corner posts 6 of the cells 1 and the vertical guide frames 14 which mate with the corner posts 6 may have any suitable cross sectional configurations. For instance, they may be H-shaped steels or channel steels. Furthermore the catalyst stowing racks (14, 15) may be increased or decreased in number according to the desired denitrification capacity.

Figure 11:
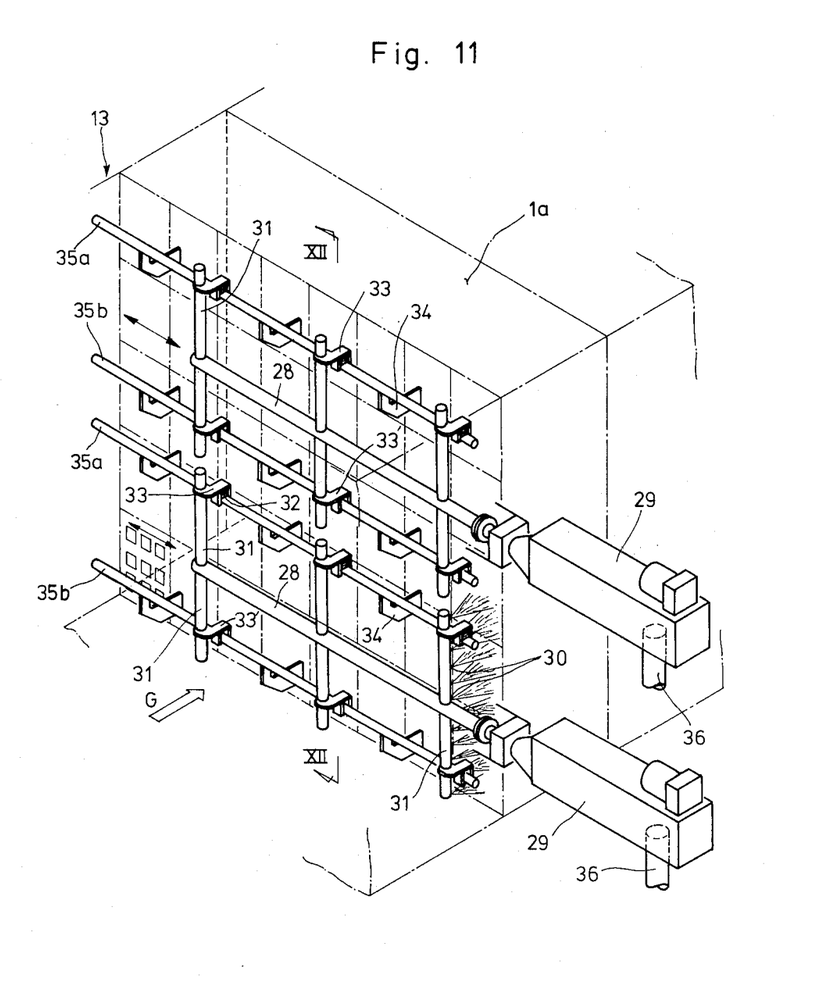
FIG. 11 is a perspective view of a dust removing device in accordance with the present invention which is disposed within the reactor vessel in order to decontaminate the catalyst blocks.
Figure 12:
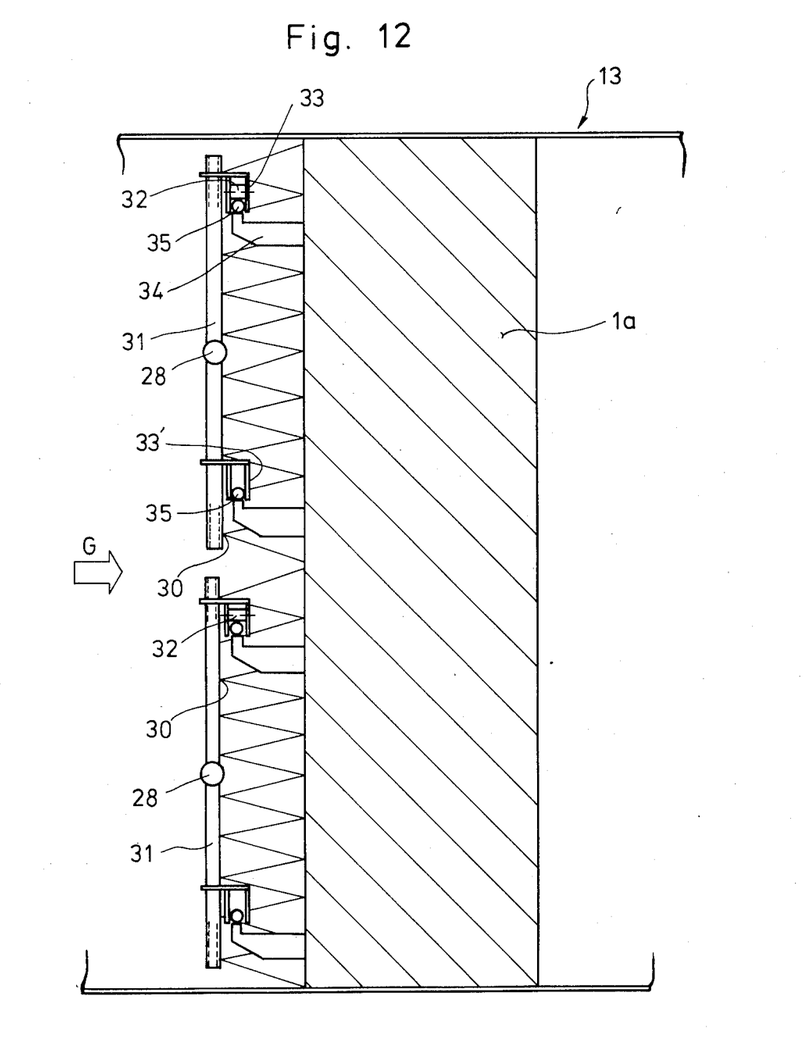
FIG. 12 is a sectional view taken along the line XII—XII of FIG. 11.

While the effluent flows through the honeycomb catalyst blocks 9 and is denitrated, dust, soot and the like are deposited on the catalyst blocks 9, causing the contamination thereof. Therefore they must be removed periodically as completely as possible. To this end, the present invention provides a dust removing device as shown in FIGS. 11 and 12. This device is disposed within the main body or reactor vessel 13 along the upstream side of the catalyst cell stowing rack (14, 15) and comprises a header or main pipe driving device 29 mounted in the main body or reactor vessel 13, a horizontal header or main pipe 28 one end of which is attached to the driving device 29 so as to be extended or retracted in its axial directions and so as to be hydraulically connected through the driving device 29 to a compressed air or steam supply pipe 36, and one or more vertical tributary pipes 31 which are branched upwardly and downwardly from the header or main pipe 28 and each of which is formed with a vertical array of nozzles 30 directed towards the catalyst blocks 9. The air or steam under high pressure on the order of 1–20 kg/cm$^2$g is discharged through these nozzles 30 into the catalyst blocks 9 so as to blow off the dust and the like deposited on them.

The number of vertical tributary pipes 31 is dependent upon the stroke of the header or main pipe 28 which is driven by the driving device 29. For instance when the stroke is equal to the width of a pile 1a of the catalyst cells 1, only one tributary pipe 31 suffices. However when the stroke of the header or main pipe 28 is one third ($\frac{1}{3}$) of the width, three tributary pipes 31 are branched as shown in FIG. 11 and spaced apart from each other by a distance equal to the stroke.

The movement of the header or main pipe and tributary pipe assembly is guided by a pair of vertically spaced apart guide rails 35a and 35b which are horizontally supported by brackets 34 which in turn are attached to the vertical guide frames 14 of the catalyst cell stowing rack (14, 15). The upper end of the tributary pipe 31 is fitted with a bracket 33 having a guide roller 32 which rides on the upper guide rail 35a while the lower end thereof is fitted with a bracket 33' having a pair of downwardly extended projections which are slidably fitted over the lower guide rail 35b.

The length of the vertical tributary pipe 31 is determined depending upon the overall height of the pile 1a of the cells 1, the number of headers or main pipes 28 and their arrangement. In any case, the air or steam under high pressure from the nozzles 30 must extend the overall height of the pile 1a of the cells 1.

In operation, while the header or main pipe and tributary pipe assembly is moved along the guide rails 35a and 35b in the horizontal direction in parallel with the upstream side of the pile 1a of the cells 1, the air or steam under high pressure is discharged through the nozzles 30 of the tributary pipes 31 so that the air or steam jets forcibly impinge against the whole of the dust-laden surfaces of the catalyst blocks 9 and consequently dust, soot and the like may be carried away by the air or steam flows. Thus the catalyst blocks 9 may be completely decontaminated.

Reaction forces produced when the air or steam under high pressure is discharged through the nozzles 30 are transmitted through the upper and lower guide brackets 33 and 33' of the tributary pipes 31 to the upper and lower guide rails 35a and 35b so that the vibration of the tributary pipes 31 may be avoided. As a consequence the smooth movement of the main and tributary pipe assembly may be ensured.

Figure 13:
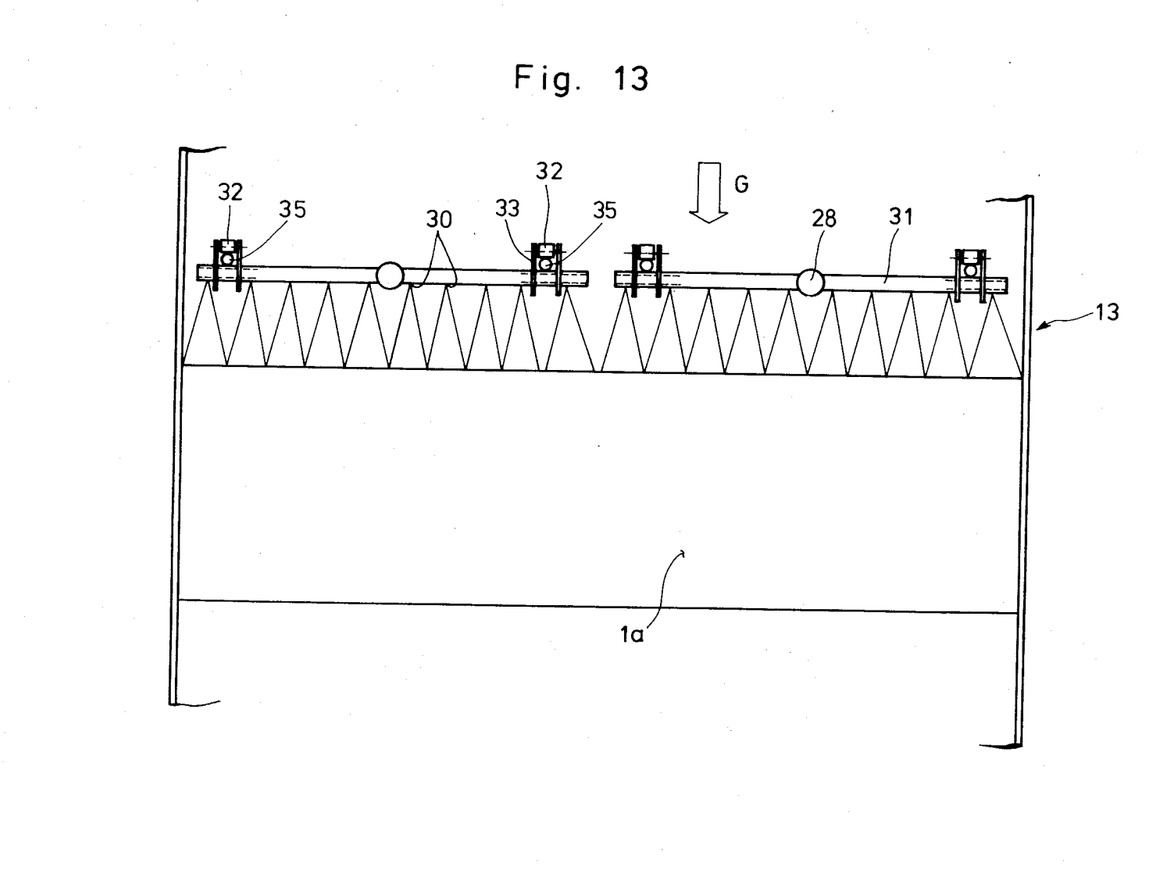
FIG. 13 is a schematic, sectional view of a modification of the dust removing device shown in FIGS. 11 and 12.

In FIG. 13 is shown a dust removing device adapted for use in a vertical denitrification reactor wherein the direction G of the gas or effluent flow is from the top to the bottom. The vertical dust removing device is substantially similar in construction to the dust removal device which is shown in FIGS. 11 and 12 and may be referred to as "the horizontal dust removal device" except that the device shown in FIG. 13 is disposed horizontally and that both ends of the tributary pipe 31 are fitted with the guide brackets 33 each having the guide roller 32 which rides on the guide rails 35 which is now extended horizontally.

In operation, the air or steam under high pressure is downwardly discharged towards the catalyst blocks, attaining the same cleaning effects as the device shown in FIGS. 11 and 12.

The effects, features and advantages of the present invention may be summarized as follows:

(I) The honeycomb catalyst blocks 9 are packed in the catalyst cells 1 which in turn are stowed in the catalyst stowing racks in the main body or reactor vessel 13. As a result, the handling and transferring of the catalyst cells 1 may be much facilitated so that the replacement of the cells 1 may be accomplished within a short time.

(II) Since the catalyst cells 1 are gas-tightly pressed against the vertical guide frames 14, the effluent may be completely prevented from bypassing the catalyst blocks 9.

(III) The packing sheets 10 made of ceramic fiber are inserted into the catalyst block stowing chambers 8 of the cell 1 so that the adjacent catalyst blocks 9 may be brought into completely gas-tight contact with each other while the outermost blocks 9 may be also brought into completely gas-tight contact with the top walls 2, the side walls 4, the bottom wall 3 and the vertical and horizontal partition walls 7. As a consequence, not only the effluent can be prevented from bypassing the catalyst blocks 9, but also damage to the catalyst blocks may be eliminated during the handling and transferring. In addition, it is to be emphasized that gas leakage and thermal distortions due to the temperature difference among the catalyst blocks 9, the top walls 2, the side walls 4, the bottom wall 3 and the horizontal and vertical partition walls 7 may be eliminated.

(IV) The hoist 17 is used for loading or off-loading the catalyst cells 1 so that the loading and off-loading efficiency may be remarkably improved.

(V) Both the top and side walls 2 and 4 are swingably attached so that the stowing of the catalyst blocks 9 and the placement of packing sheets 10 may be much facilitated.

(VI) The catalyst block stoppers or retainers 11 are fitted into the open ends of each of the catalyst block stowing chambers 8 of the cell 1 so that the catalyst blocks 9 and the packing sheets 10 may be securely held in position during the handling, transferring and operation.

(VII) The corner posts 6 of the cell 1 have a high strength because of their shape and dimensions so that a plurality of catalyst cells 1 may be safely piled up in stacks without causing buckling.

(VIII) The dust removing device is provided so as to discharge the air or steam under high pressure against the catalyst blocks in the reactor vessel 13 so that they may be thoroughly decontaminated from dust, soot and the like without suspending the operation of the denitrification reactor.

What is claimed is:

1. A denitrification reactor incorporating catalyst cells wherein each of the catalyst cells is produced by packing a plurality of honeycomb catalyst blocks into a box-shaped frame having four corner posts and two opposed open ends, a plurality of vertical guide posts erected within a reactor main body and spaced apart from each other in such a way that four adjacent vertical guide posts may vertically guide the corner posts of said catalyst cell, each of said vertical guide posts being provided with a plurality of clamping means adapted to tightly press said corner posts of said catalyst cell against said vertical guide posts, hoisting means mounted on the top of said reactor main body for loading and unloading said catalyst cells into and out of said vertical guide posts, the frame of said catalyst cell being divided by vertical and horizontal partition walls into a plurality of catalyst block stowing chambers, and elastic packing sheets made of ceramic fiber or the like placed between the catalyst blocks and said vertical and horizontal partition walls and the top, side and bottom walls of said box-shaped frame.

2. A denitrification reactor as set forth in claim 1 wherein said corner posts of said box-shaped frame of said catalyst cell are polygonal in cross section.

3. A denitrification reactor as set forth in claim 1 wherein at least one dust removing device is disposed within said reactor main body along the upstream side of each of piles of said catalyst cells stacked in said reactor main body; and said dust removing device comprises a main pipe extended in parallel with and spaced apart by a suitable distance from said upstream side of each pile, driving means operatively connected to said main pipe for displacing the same in the axial direction thereof, and at least one tributary pipe branched from said main pipe at right angles thereto and formed with a plurality of nozzles which are spaced apart from each other by a suitable distance and are directed toward said upstream side of each pile, whereby as the assembly of said main pipe and said at least one tributary pipe is moved along said upstream side of each pile, fluid under high pressure may be discharged through said nozzles against said upstream side of each pile, thereby decontaminating said catalyst blocks.

4. A denitrification reactor incorporating catalyst cells wherein each of the catalyst cells is produced by packing a plurality of honeycomb catalyst blocks into a box-shaped frame having four corner posts and two opposed open ends, a plurality of vertical guide posts erected within a reactor main body and spaced apart from each other in such a way that four adjacent vertical guide posts may vertically guide the corner posts of said catalyst cell, each of said vertical guide posts being provided with a plurality of clamping means adapted to tightly press said corner posts of said catalyst cell against said vertical guide posts, hoisting means mounted on the top of said reactor main body for loading and unloading said catalyst cells into and out of said vertical guide posts, the frame of said catalyst cell being divided by vertical and horizontal partition walls into a plurality of catalyst block stowing chambers, and elastic packing sheets made of ceramic fiber or the like placed between the catalyst blocks and said vertical and horizontal partition walls and the top, side and bottom walls of said box-shaped frame, the top and side walls of the box-shaped frame of the catalyst cell are swingably attached.

5. A denitrification reactor incorporating catalyst cells wherein each of the catalyst cells is produced by packing a plurality of honeycomb catalyst blocks into a box-shaped frame having four corner posts and two opposed open ends, a plurality of vertical guide posts erected within a reactor main body and spaced apart from each other in such a way that four adjacent vertical guide posts may vertically guide the corner posts of said catalyst cell, each of said vertical guide posts being provided with a plurality of clamping means adapted to tightly press said corner posts of said catalyst cell against said vertical guide posts, hoisting means mounted on the top of said reactor main body for loading and unloading said catalyst cells into and out of said vertical guide posts, the frame of said catalyst cell being divided by vertical and horizontal partition walls into a plurality of catalyst block stowing chambers, and elastic packing sheets made of ceramic fiber or the like placed between the catalyst blocks and said vertical and horizontal partition walls and the top, side and bottom walls of said box-shaped frame, wherein catalyst block retainers are fitted into the open ends of each of said catalyst block stowing chambers after said catalyst blocks are positioned in said catalyst block stowing chambers.

* * * * *